United States Patent [19]
Lucas

[11] Patent Number: 4,927,321
[45] Date of Patent: May 22, 1990

[54] DEVICE FOR STACKING BATCHES OF FLAT OBJECTS IN A VERTICAL FILE

[75] Inventor: Raymond Lucas, Villandraut, France

[73] Assignee: Bobst SA, Switzerland

[21] Appl. No.: 227,637

[22] Filed: Aug. 3, 1988

[30] Foreign Application Priority Data

Aug. 5, 1987 [FR] France .................................. 87 11187

[51] Int. Cl.⁵ ..................... B65H 29/40; B65H 31/20; B65H 31/30
[52] U.S. Cl. .............................. 414/788.9; 414/789.1; 414/790.7; 414/794.2; 414/794.8; 414/900
[58] Field of Search .................. 414/788.9, 789, 789.1, 414/790.7, 790.8, 791.6, 792.6, 900, 792.8, 794.2, 794.8, 924; 221/175, 221, 222, 223, 297; 271/192

[56] References Cited

U.S. PATENT DOCUMENTS

| | | | |
|---|---|---|---|
| 2,832,480 | 4/1958 | Barski | 414/788.9 |
| 2,984,838 | 5/1961 | Parker | 414/792.6 X |
| 3,938,674 | 2/1976 | Kroeze et al. | 414/790.8 |
| 4,439,084 | 3/1984 | Werkheiser | 414/794.2 X |
| 4,708,565 | 11/1987 | Rohrbein | 414/794.8 |

FOREIGN PATENT DOCUMENTS 2443781  8/1975  Fed. Rep. of Germany .
8304185  3/1983  France .

Primary Examiner—Joseph J. Rolla
Assistant Examiner—Edward S. Ammeen
Attorney, Agent, or Firm—Hill, Van Santen, Steadman & Simpson

[57] ABSTRACT

A stacking device includes an infeed table for batches destined to be assembled in a layer to be placed on a pile, and a conveying device for moving the layer over the pile and for supporting the layer above the pile. The conveying device includes an arrangement for releasing the layer to allow the layer to set on the pile.

6 Claims, 15 Drawing Sheets

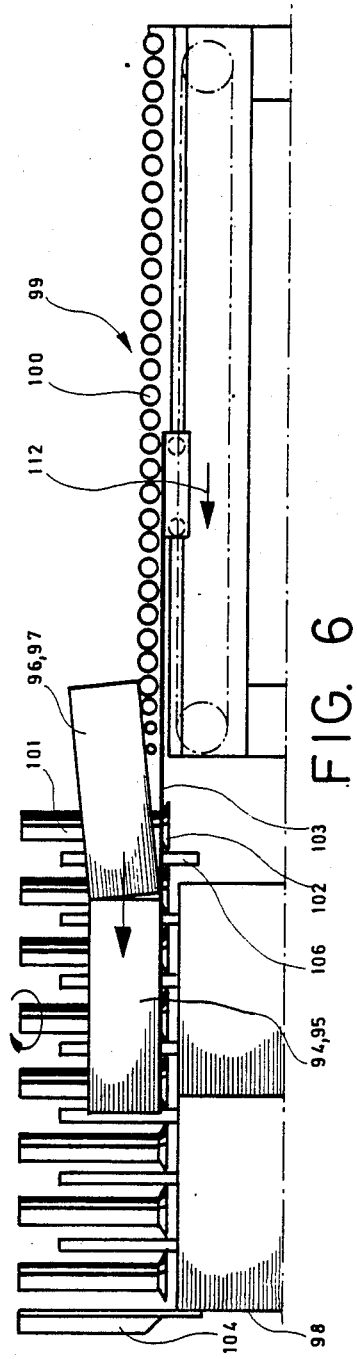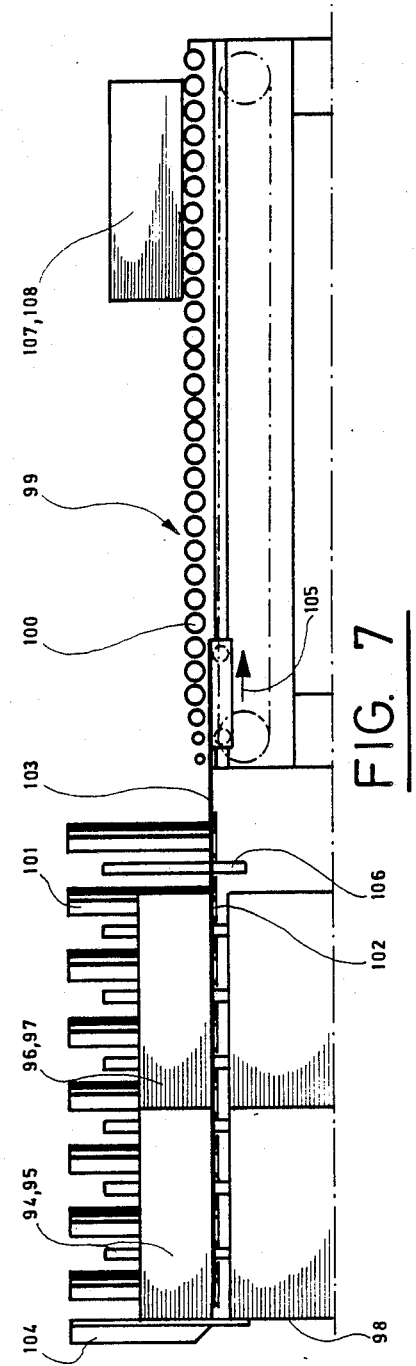

DEVICE FOR STACKING BATCHES OF FLAT OBJECTS IN A VERTICAL FILE

BACKGROUND OF THE INVENTION

The present invention is concerned with a device which is designed for stacking batches of flat objects, especially batches of corrugated folding boxes or non-folded blanks of such boxes, which are arranged in successive layers on an appropriate loading plane or pallet.

In the present state of the art, there are devices called palletizers, which are capable of ensuring that batches of folded boxes or box blanks are stacked on a loading plane and especially on a pallet. The batches generally handled have a shape of a parallelepiped of relatively considerable dimensions and weights.

One of the known devices is described in my U.S. patent application Ser. No. 586,048, filed Mar. 5, 1984, which is based on French Application 83 04185, and whose disclosure is incorporated by reference thereto. As disclosed in this U.S. Patent Application, batches of boards, boxes or blanks are stacked on a loading plane in successive layers formed by the batches one after another. This operation is achieved beginning with a loading table or elevator with horizontally disposed rollers. The table or elevator is vertically movable between a fixed inlet level and variable levels corresponding to the height of the topmost surface of the stack of blanks on a pallet. Various batches are transferred from the appropriately placed inlet means at the fixed level onto the loading table. The table is then shifted vertically with the idea of having its position at a level corresponding to the plane on which the layer of batches is to be put on the stack of batches. The layer situated on the loading table is then lifted by a number of thin forks, which are arranged between the rollers of the table. The forks carrying the layer of boards, boxes or blanks are then moved perpendicularly to the direction of the arrival of the layers so that they will be situated above the loading plane or the previously placed layer. At this stage, a stop is then lowered in the rear area and the forks are withdrawn from underneath the layer, whereupon the layer will then be placed on the stack as the forks return to their initial position between the rollers of the loading table. The joint action of the stop and of the withdrawing of the forks will result in accurately aligning all superposed layers of the pile on a vertical line.

The number of layers wanted for a full pile having, thus, been attained, the pile will then be removed allowing for the possible build-up of a new or second pile.

Another device is disclosed in German Published Application OS 24 43 781 and this device also allows for a layer-wise superposition of batches of corrugated sheets. In this device, the previous batch of sheets are carried by a belt conveyor to the rollers of an intermediate station. The batches are then transferred into a batch collector before being moved into the piling station proper. The piling station has retractable components supporting the lateral parts of the batches carried into this station, as well as squaring devices for the batch layer shaped by the arrival of several successive batches. As soon as the number of batches which are supposed to be accumulated is obtained, retractable components are actuated, whereupon the batch layer is then put on a precedent layer already lying on a vertically shiftable pile delivery. As soon as the batch layer has been laid down, the pile delivery is actuated in such a way as to have it descend until the upper surface of the batch layer is again situated on the plane enabling the superposition of a new layer on the one already laid down. The stacking of the layers continues until the pile delivery will reach its lowermost position. At this stage, the arrival of the batches will be interrupted during a period required for the removal of the pile of batches and for the return of the pile delivery into a position it had in the beginning of the loading operation. Attention is to be drawn to the fact that the first device described above allows the stacking of layers made up by batches arranged side-by-side and crosswise with the rows thus formed being assembled behind one another on the loading plane in such a way that the layer will be stackable. The second device handles the stacking of batches arranged behind one another, therewith being coherent.

The devices described above usually operate satisfactorily regarding the quality of the top piling that is achieved. However, on account of their design, the fact is established that they cannot be operated at high operating speeds likely to correspond to the steadily increasing production speeds of the machines operating upstream of the batch stackers. Moreover, such devices involve the necessity of using a large number of drive systems for the various appliances which they include.

SUMMARY OF THE INVENTION

The present invention is directed to a device appropriately designed to enable high-speed stacking of successive piled bundles or non-bundled batches of flat objects, discarding thereby the drawbacks inherent in the known palletizing devices and enabling the piling of a layer of the batch consisting of one or more rows composed of one or several batches arranged side-by-side.

To accomplish these goals, the invention is directed to an improvement for stacking flat, batchwise arranged objects, especially batches of corrugated folding boxes or non-folded blanks of such boxes, on an appropriate loading plane of a type including an infeed means for the batches, means for conveying the layer of batches above a vertically movable loading plane from said infeed means, means for retaining and then putting down the layer on top of the loading plane, means for laterally guiding of said batch layer when the latter is laid onto the loading plane, means for insuring the front position of every layer of batches and means for vertically shifting said loading plane. The improvements are that the batch infeed means is made up of a table with motor-driven rollers operating jointly with a lateral baffle arrangement that extend at right angles to the axis of the motor-driven rollers, that the means for conveying a layer of batches situated above the vertically movable loading plane consist of a certain number of motor-driven rollers situated vertically at appropriate intervals on both sides of the layer of the batches to be conveyed, said motor-driven rollers being fitted in such a way as to allow for lateral shifting with regard to the conveying axis of the layer to be conveyed, said rollers having means for retaining the layer and then putting down said layer, which means consists of at least a retaining appliance on each of the rollers, that a support operated jointly with said motor-driven rollers is arranged vertically on both sides of the layer of batches to be laid down, that said means for laterally guiding of said layer during putting the layer down on the loading plane consists of vertical batch guides arranged within the space existing between the vertically driven rollers, that the means for insuring the front position of every layer consists of an adjustable stop, as required by the size of said layer, and that said motor-driven rollers arranged vertically on both sides of the batch layer, the vertical batch guides and the lateral baffles are constructed in such a way that the position with regard to the shifting axis of the batch or layer can be adjusted to the size of the layer. Such a device is outstanding for its very high-speed potential for laying down successive folded boxes or batches of blanks enhanced by the accuracy of the stacking of the various layers on their loading plane and by the possibility to stacking different composite layers of rows comprising a single or several batches arranged side-by-side.

Other essential benefits of the device of the present invention consists in the fact that, owing to the means for conveying used for shifting the layers above the loading plane, the layer can be moved on a level above the loading plane by shifting every batch row of the layer throughout the transportation.

Other features and benefits will be gathered from the following description of the preferred embodiments, the drawings and the claims.

BRIEF DESCRIPTION OF THE DRAWINGS

FIGS. 6, 7 and 8 are side views of a modification for stacking batches, with FIG. 6 showing conveying the batches to a position over the stack, FIG. 7 showing batches in position over the pile, and FIG. 8 showing the depositing of the batches onto the pile with a new group of batches moving towards the insertion stage;

DESCRIPTION OF THE PREFERRED EMBODIMENTS

Figure 1:
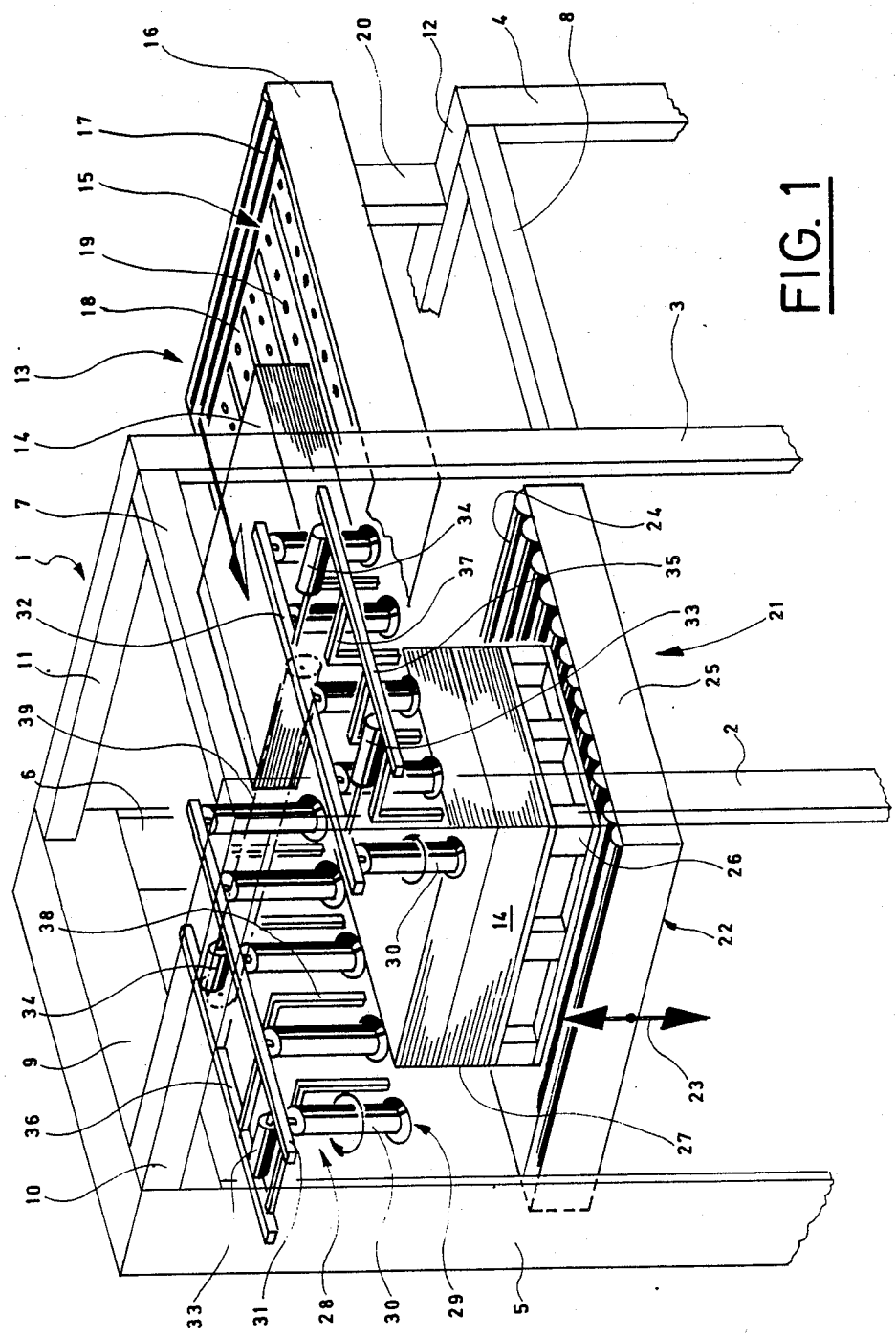
FIG. 1 is a schematic perspective view of a stacking device in accordance with the present invention.

The principles of the present invention are particularly useful in a piling device, which is generally indicated at 1 in FIG. 1. The piling device 1 includes a main frame consisting of side posts 2, 3, 4, 5 and 6, which are connected to one another by crossbars 7, 8 and 9 and by struts 10, 11 and 12. For simplification of the drawings, the posts and crossbars of an infeed area 13 for the batches 14 situated in the rear of the device 1 have not been represented. An infeed table 15 for the batches 14 is secured in a frame 16. In the example of FIG. 1, the infeed table 15 is equipped with a mixed conveying device including inlet rollers 17 and a handling plane 18 equipped with rolls 19. The frame 16 is secured on one side of the post 3 and 6 of the main frame for the device 1 and on the other side to the strut 12 by means of two supports 20 (only one illustrated).

A stacking station 21 is arranged between the posts 2, 3, 5 and 6 of the main frame for the device 1. The stacking station includes a loading plane or elevator 22, which is vertically movable from bottom to top and from top to bottom, as indicated by a double arrow 23. The control of the vertical motion, as well as a system for guiding this loading plane 22, are executed in a way well known in the art, which are not shown in detail. In the illustrated example, the loading plane 22 consists of a certain number of motor-driven rollers 24, which are secured in a cradle 25, which is connected to the guiding and control appliance, not illustrated. The motor-driven rollers of the loading plane 22 are appropriately provided with a pallet 26, which carries a pile 27 of batches 14 laid down by the conveying device 28 and the retaining appliance 29.

The conveyance appliance 28 and retaining appliance 29 are part of a stacking station 21. As shown schematically in FIG. 1, the conveying appliance 28 includes several motor-driven rollers 30 situated opposite one another on both sides of the batch or layer 14. These motor-driven rollers 30 are arranged to extend on a vertical axis and are spaced appropriately from one another. The execution shows every motor-driven roller 30 is held in a longitudinal beam 31 and 32, respectively. The control insures that the drive of the motor-driven rollers 30, as described further in FIGS. 2 and 3, though it is not represented here in order to provide easier appreciation of the Figure. Both the longitudinal beams 31 and 32, respectively, are mounted in such a way as to allow crosswise shifting through the action of two compressed air cylinders 33 and 34, which are fitted on support bars 35 and 36. The support bars 35 and 36 also provide for vertical batch guides 37 and 38, which are arranged within the free space between each of the motor-driven rollers 30 downstream so that the guiding plane should be aligned somewhat with the tangent of the motor-driven rollers 30.

In order to insure the processing of the batch 14 of various sizes, the support bars 35 and 36 are connected to a setting appliance 39, which is schematically illustrated by a dot-dash line, and will shift these in a horizontal direction in the frame of the device 1. The appliance 39 will be described in greater detail with references to FIGS. 2 and 3.

Figure 2:
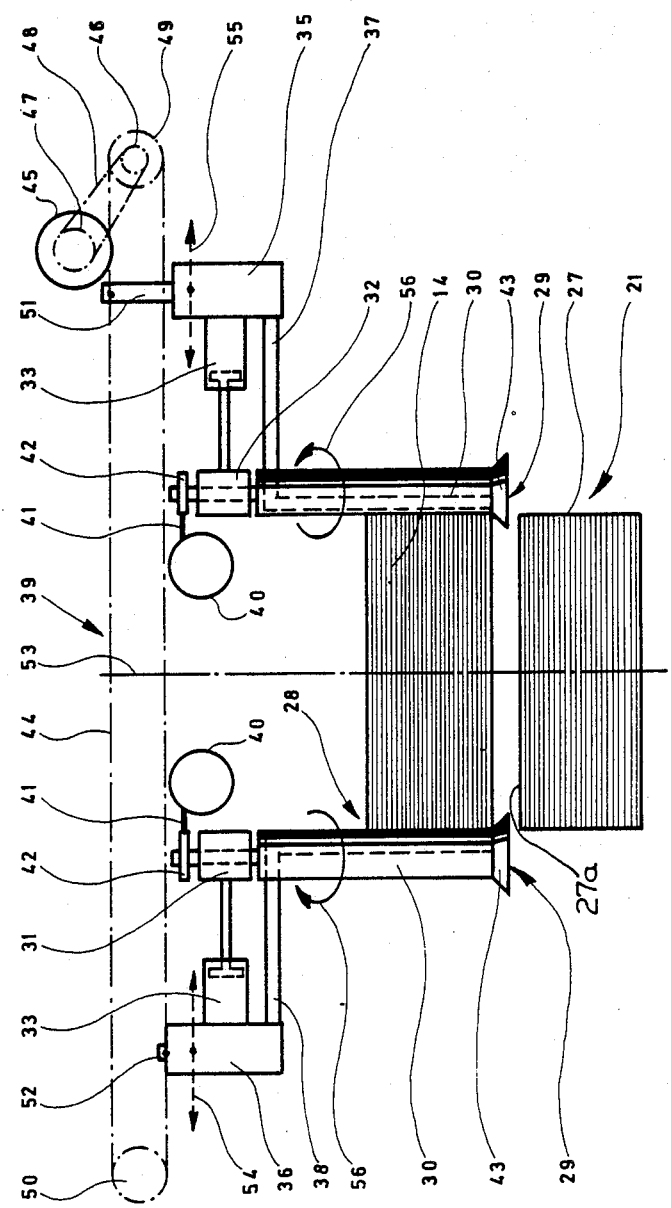
FIG. 2 is a schematic end view of the device of FIG. 1.
Figure 3:
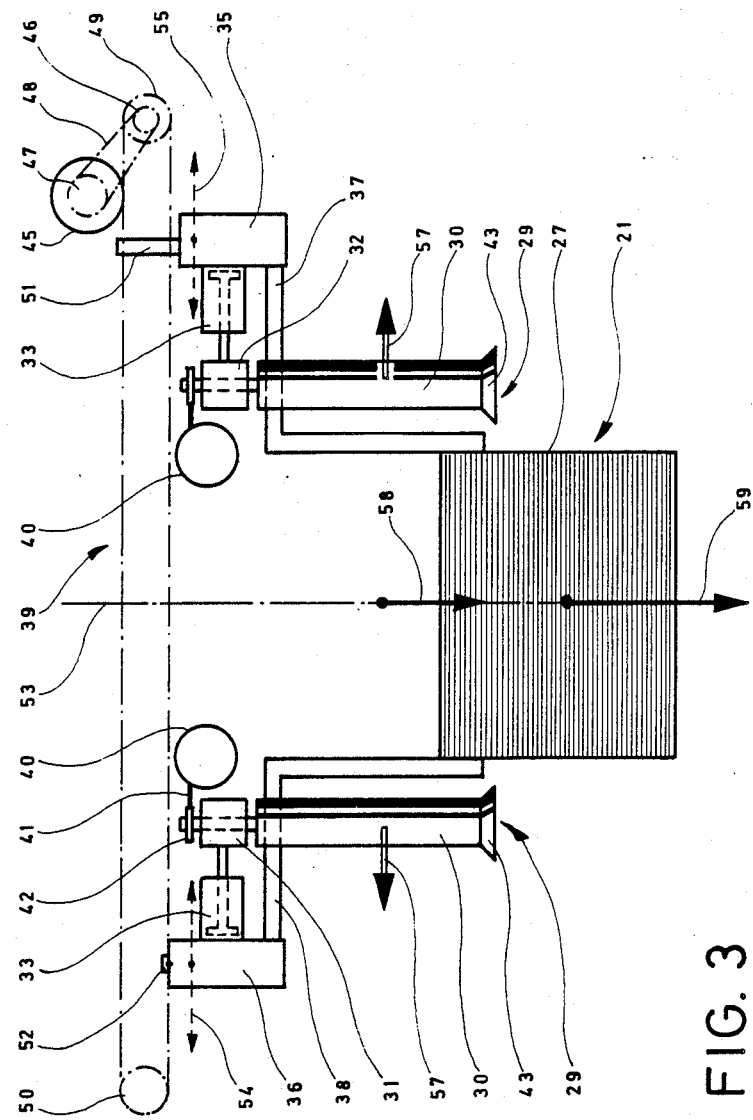
FIG. 3 is a schematic end view similar to FIG. 2 showing the movement when depositing the layer of boxes on the loading surface.

The FIGS. 2 and 3 represent schematically, the way in which a laid down layer or batch of folded blanks or folded boxes is placed onto an upper part or surface of a pile. In this execution, with reference to the piling device of FIG. 1, batch 14 appears in the form of a pile of large size folded boxes or blanks. Consequently, the pile 27 is obtained, which will have a single configuration, since it consists of layers which are each composed of a single batch 14 of folded boxes or blanks.

The conveyance device 28 of the piling station 21, as illustrated in FIG. 2, appears in a phase corresponding to the conveyance of a batch 14 of folded boxes or blanks between the infeed table 15 (see FIG. 1) and a point above a pile 27 already built up within the piling station 21. The batch 14, which is aligned against a lateral baffle, such as 37 and 38 (best illustrated in FIG. 3), which are mounted on supporting parts 35 and 36 and extend from one side of the infeed table 15, is taken over by the motor-driven rollers 30 which, at this stage, are driven by a motor 40 which is connected through a chain set 41 to the pinion 42 fixed on the upper end of each motor-driven roller 30. As has been mentioned already in the description of FIG. 1, the lower end of every motor-driven roller 30 is equipped with a retaining appliance 29, which is illustrated as being a truncated disk 43 secured against the lower end of each motor-driven roller 30.

The lateral positioning of every set or row of motor-driven rollers 30 is determined by the size of the batch 14. In order to have the set or rows of motor-driven rollers 30, as well as the vertical baffle guides 37 and 38 move to their operating position, it is desired to connect both supporting bars 35 and 36 to a setting appliance 39 consisting of an endless chain 44 that extends between two sprocket wheels 49 and 50. To rotate the chain 44, a motor 45 has an output shaft with a sprocket wheel 47 that engages a chain 48 that goes to a sprocket 46 which drives the sprocket 49 so that rotation of the motor 45 in one direction will cause the chain 44 to be rotated in one direction and rotation of the drive motor in the opposite direction will cause a shifting in the opposite direction. The upper strand or run of the endless chain 45 is equipped with a special link, on which exists a tongue or element 51, which is permanently attached to the supporting bar 35. The lower strand or run is provided with a special link which has a tongue 52 which is identical to the tongue 51 and which tongue 52 is permanently connected to the supporting bar 36. The motor is arranged in such a way as to be able to rotate in both directions and its motion causes the shifting of the two rows of motor-driven roller assembly 30 and batch guide 37 and 38 relative to an axis 53 in the direction indicated by the double arrows 54 and 55. On account of the conception adopted, the above-mentioned assemblies will undergo a shift through a distance identical for each of them when the motor 45 is put into action. Thus, the spacing between the supports 35 and 36 can be adjusted for the width of the blanks being handled.

In the phase represented in FIG. 2, the motor-driven rollers 30 have been set to the size of the batch 14 and are, thus, rotated in a direction indicated by arrows 56 until the batch reaches a point or position above the pile 27. During this transport action, the batch sides will be pressed with their lower lateral edges onto the truncated disk 43, which are permanently connected with the motor-driven rollers 30. The rigidity of the batch 14, which is in direct consequence of the material used for building up the batches 14, such as corrugated boards in the present case, will enable the adoption of such a solution for the support of the batch 14 during its transportation.

FIG. 3 shows the piling station 21 in the phase allowing the laying down of the batch 14. After the batch 14 has been carried to a point directly above the pile 27, as illustrated in FIG. 2, the rotation of the motor-driven rollers 30 is interrupted and each set of motor-driven rollers 30 is moved away from the batch side 14 in the direction shown by the arrows 57 (FIG. 3). This motion is controlled by the compressed air cylinders 33 and 34 acting between the longitudinal beams 31 and 32 and the fixed means or bars 36 and 35, respectively. While the rollers will be shifted in the direction of the arrows 57, batch guides 37 and 38, which are mounted on the support bars 35 and 36 are, thus, not shifted and, thus, will guide the batch 14 when it is laid down in the direction of arrow 58 on top of the pile 27, which is already built up. The batch 14, having been put on top of the pile 27, the load plane 22 (see FIG. 1) will be moved in the direction of arrow 59 until the top surface of the pile newly formed by the applying of the batch 14 will reach a position enabling a new batch to be laid down, which is the position of the top surface 27a of the pile 27, as illustrated in FIG. 2.

Figure 4:
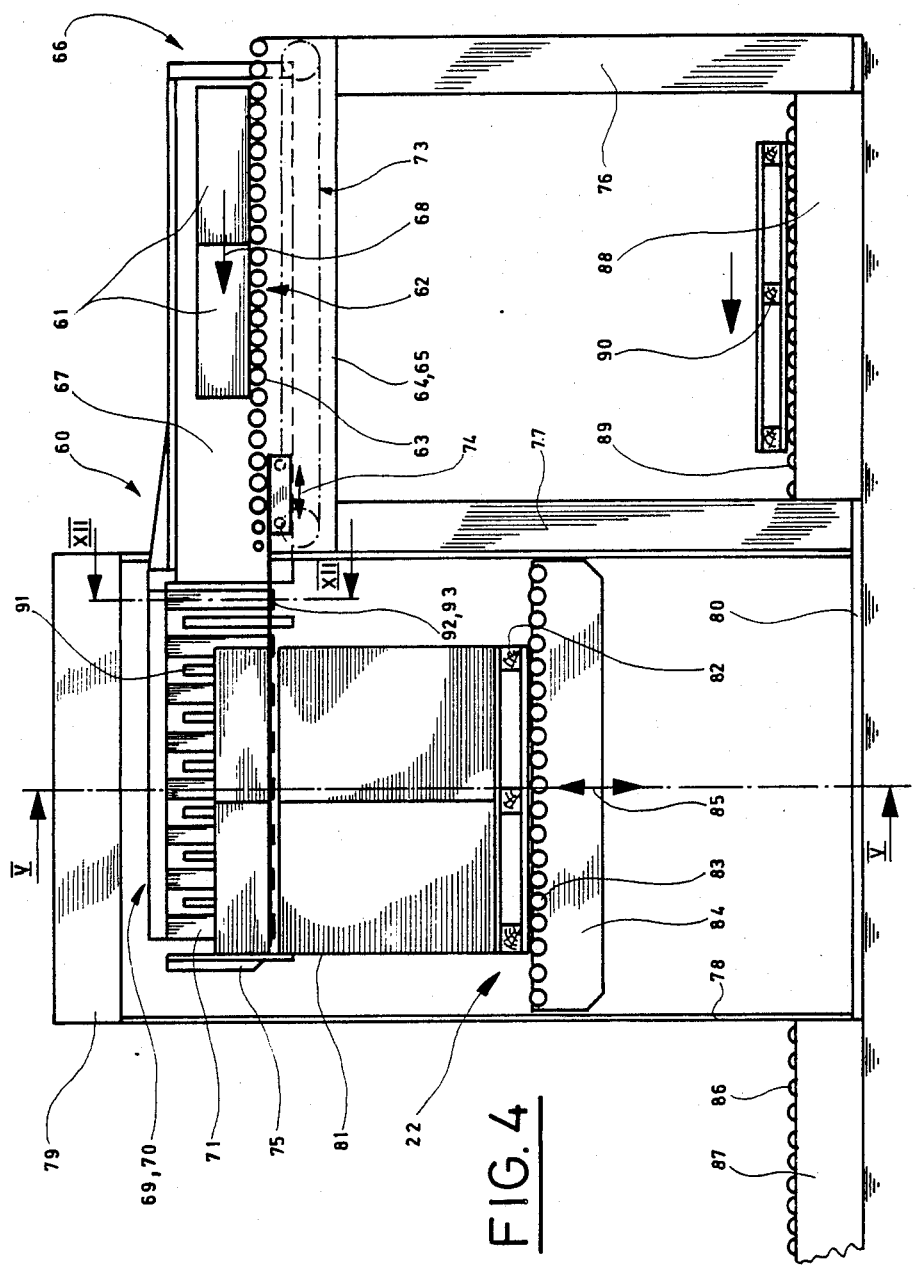
FIG. 4 is a side view with portions broken away of an embodiment of the stacker of FIG. 1.

An embodiment of the device is illustrated by the stacker 60 in FIG. 4, and this embodiment enables not only the stacking of a layer consisting of a single batch, but also of a layer consisting of batches, such as 61, which are arranged side-by-side and one behind the other. This way of arranging the batches of the layer is met especially when processing small-size folded boxes or blanks.

The batches 61 might originate from a machine arranged upstream to an infeed table 62. In certain cases, they can also be arranged manually on this infeed table 62. The infeed table 62 consists of a number of motor-driven conveyor rollers 63, which are arranged one beside the other between the side frames 64 and 65 of the infeed station 66 of the stacker 60.

The batches 61 moved on a sequentially motor-driven conveyor rollers 63 are aligned crosswise against a lateral baffle 67, which extends at right angles to the axles of the rollers 63 and parallel with regard to the direction of movement on the conveyor 63, as indicated by the arrow 68. The lateral baffle 67 may be made of a flat piece of sheet metal with one end folded in such a way as to form a slanting plane designed for insuring an easy alignment of the batches 61 arriving on the conveyor roller 63. The lateral baffle 67 is moreover permanently secured against the conveyor component 69 in such a way that its side serves as a stop for the batches 61, which will be aligned on a tangent of the motor-driven vertical roller 71. As the conveyor component 69 is laterally shiftable allowing it to be adjusted to the size of the layer of batches 61, the lateral baffle 67 permanently secured thereto can be shifted in the same amount.

The conveyor components 69 and 70 are the same type as those described for FIGS. 1, 2 and 3 and have telescopically or extendable batch guides 91, which are arranged between the various motor-driven vertical rollers 71 and 72. A detailed description of the structure of the batch guides 91 will be provided hereinafter with reference to FIGS. 13, 14 and 15. The stacker 60 is moreover equipped with a supporting appliance 73 for the batch layer 61, which will also be described in detail in FIGS. 16–19. The supporting appliance or component 73 carries out a reciprocal movement in the direction of the double arrow 74, and this movement is accomplished proportionally to the movement of the layer 61 on the infeed table 62 and between the conveyor components 69 and 70. The execution shows that the stacker also includes a front baffle 75, which is adjustable according to the size of the layer of batches 61 which are to be stacked. With regard to its frame, it is moreover designed according to the model of the device of FIG. 1. Consequently, it includes the side posts 76, 77 and 78, as well as crossbars, such as 79 and 80. The various layers 61 are stacked either on a pallet 82 or directly on rollers 83 of a pile descending device 84, which is controlled in such a way as to be shiftable vertical in the direction of the double arrow 85. A pile 81 obtained is then removed by rollers 86 of an outlet conveyor 87. If a pile is to be built up on the pallet 82, a conveyor 88 with rollers 89 is provided to deliver a new pallet 90 onto the rollers 83 of the pile descending device or elevator 84 after the previous pile 81 has been removed. The pile descending device or elevator 84 acts then as a support for the new pallet 90 and will then hoist it to the upper loading position, meaning that the upper pallet level or surface will stand at this stage on a plane just underneath the conveyor components 69 and 70.

Figure 5:
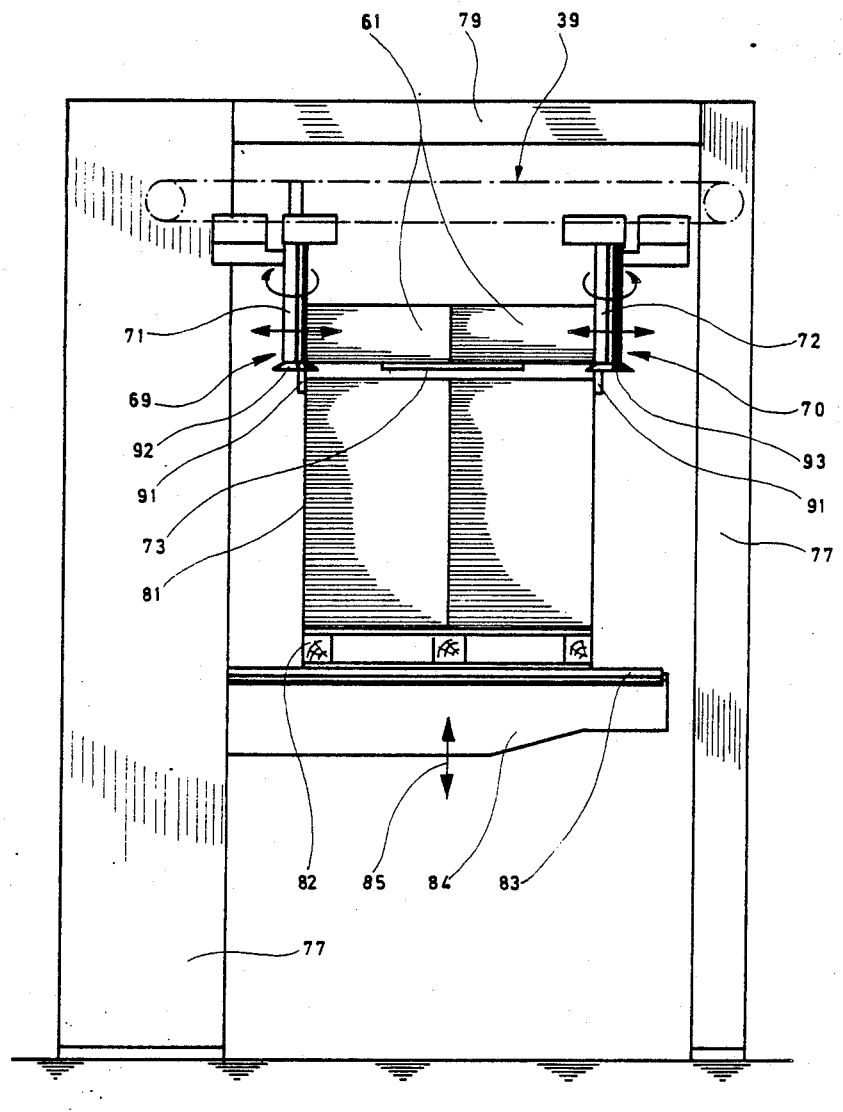
FIG. 5 is a cross sectional view taken along the lines V—V of FIG. 4.
Figure 8:
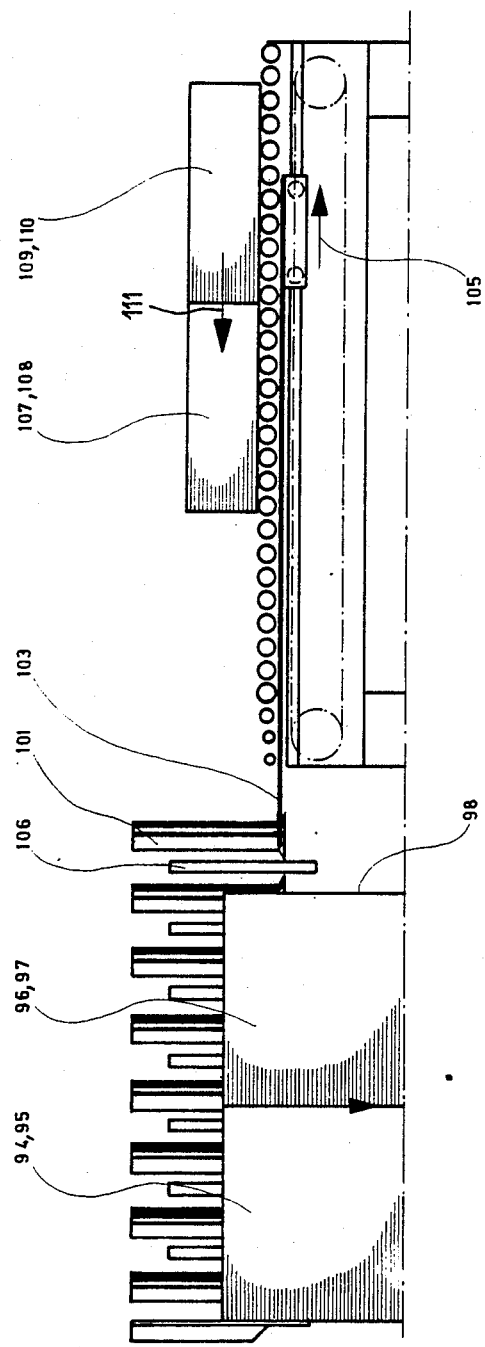
Figure 9:
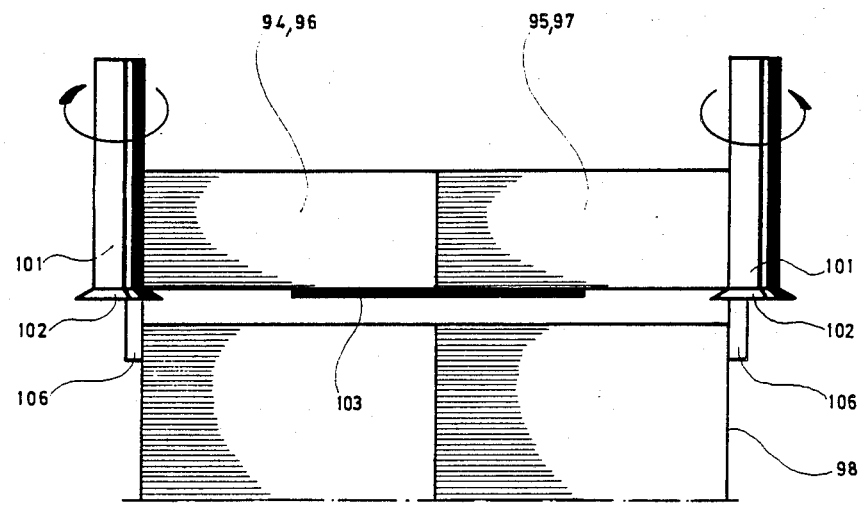
FIGS. 9, 10 and 11 are end views corresponding to FIGS. 6, 7 and 8, respectively.
Figure 10:
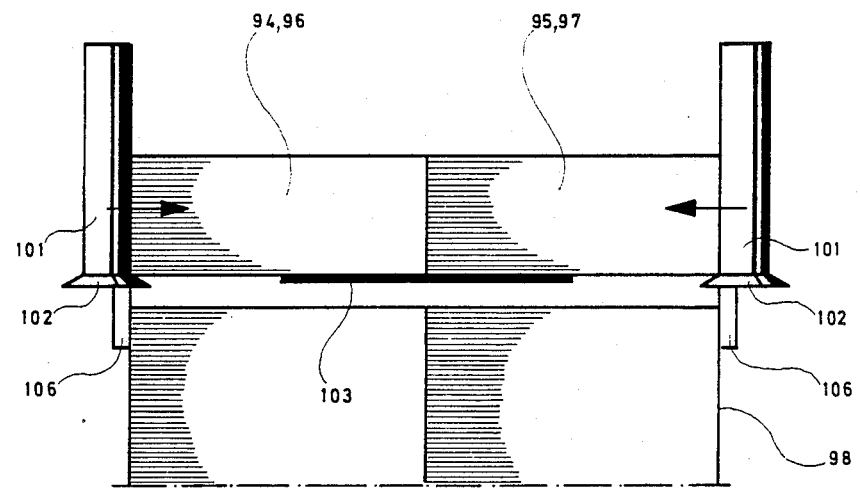
Figure 11:
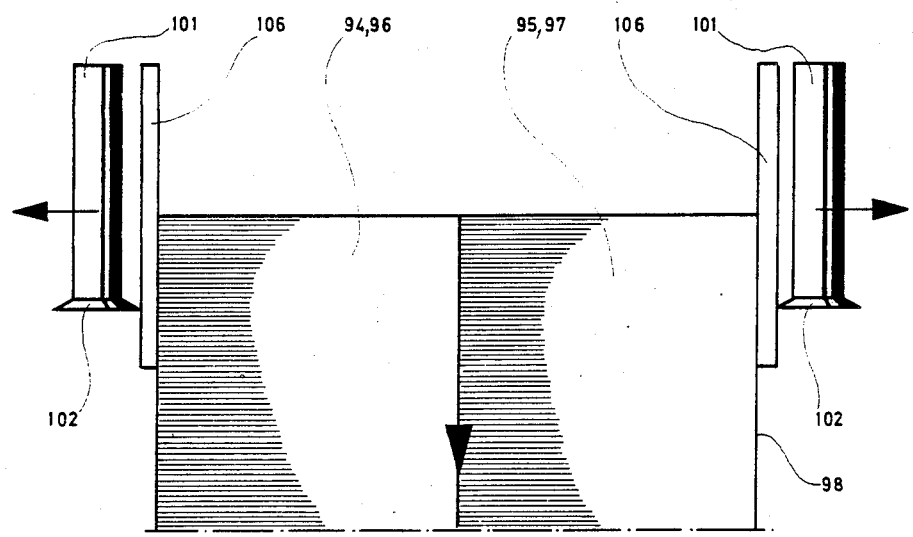

As illustrated in FIG. 5, the batches 61 are arranged side-by-side while being stacked in the pile 81, which is built up of batches on the pile 81 are already built up on pallet 82, which is supported by the rollers 83 of the elevator 84. The motor-driven vertical rollers 71 and 72, each of which is provided with a retaining appliance 92 and 93, respectively, transport and laterally support the layer formed by the batches 61 or, as the supporting appliance 73 holds the center of the layer in a region of a meeting area between the two laterally disposed batches 61. The setting appliance 39, as well as the rotary drive for the motor-driven vertical rollers 71 and 72, are the same as those described with regard to the embodiment of FIGS. 2 and 3. The action for laying a new layer onto the pile is the stacker 60 of FIG. 4 is best illustrated in FIGS. 6-11, wherein FIGS. 6-8 are schematic side views and FIGS. 9-11 are front or end views seen from the piling station. In these FIGS. the layer of batches consist of four batches 94, 95, 96 and 97.

As illustrated in FIG. 9, the first two batches 94 and 95 are spaced laterally relative to each other and are the leading two batches of the group, while the batches 96 and 97 are the following two batches, which form the layer of four batches. The layer of the four batches 94, 95, 96 and 97 are formed on the infeed table 99 and are moved to an appropriate point above the pile 98. This movement on the table is obtained by the rollers 100 of the infeed table, as well as by the vertical motor-driven rollers 101 acting on the lateral edges of the batches 94-97 which make up the layer to be put down. The lateral layer is supported laterally by the retaining appliances 102 located at the lower end of the various motor-driven vertical rollers 101 and at the center by a supporting appliance 103, which is arranged in such a way as to be shiftable simultaneously with and at the same speed as the layer of batches. At this stage, the vertical motor-driven rollers 101, as well as the rollers 100 of the infeed table 99, are driven in such a way that their circumferential speeds are equal. The layer to be put down continues its travel within the device until its front or leading edge will hit against the front stop 104 (see FIG. 7). As soon as the layer touches the front stop 104, a signal stops the motor-driven rollers 100, 101, which signal could be a sensing device to determine the contact with the stop 104. In addition, at the time of stopping the rollers 101, the supporting appliance 103 is actuated in a direction shown by an arrow 105 so as to compell it to be withdrawn from underneath the layer, whereas, simultaneously, the vertical motor-driven rollers 101 are moved away from the lateral edge, as illustrated in FIG. 11, so that the layer will be able to be placed onto the pile 98 with the batch guides 106 guiding this operation. During this operation of the movement, the rollers 100 of the infeed table are, again, put into motion to enable a first row of batches 107 and 108 (FIG. 7) to be assembled with a second row of batches 109 and 110 so as to form the new layer to be next placed on the pile. during the advance of the new layer as shown by the arrow 111. The supporting appliance 103 will terminate its retracting motion in the direction of the arrow 105, and when the front or leading edge of the new layer has obtained the end of the infeed table, the supporting appliance 103 will, again, be shifted in the direction of the arrow 112, simultaneously with the layer, as illustrated in FIG. 6. Conspicuously, in the course of these operations, the pile 98 will have descended in order to take up, again, the position represented by the top of the pile in FIG. 6, whereas the motor-driven rollers 101 will equally be moved to the size determined by the batches 94-97, as illustrated in FIG. 10. As the original situation corresponding to the image shown by the FIGS. 9 and 10 has been re-established, the subsequent layer can be placed on the pile.

Figure 12:
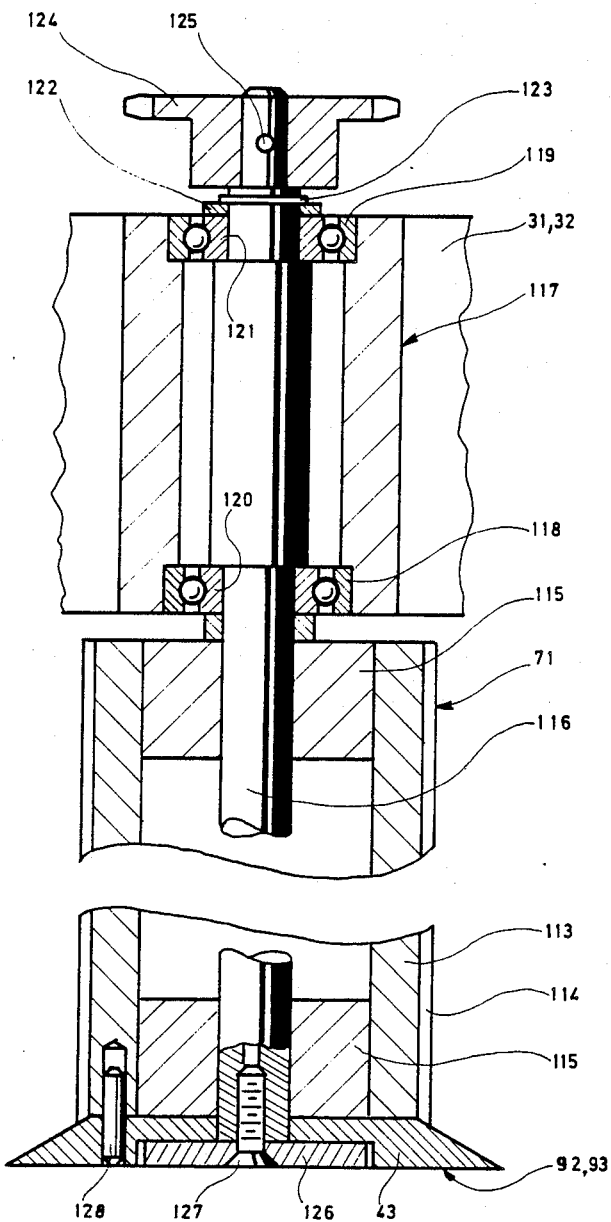
FIG. 12 is a cross sectional view taken along the lines XII—XII of FIG. 4.

The structure of each of the motor-driven rollers, such as 71 or 72, is illustrated in FIG. 12, and consists of a metal tube 113 covered by a tubular sleeve 114 adopted for insuring an acceptable friction coefficient between the vertical rollers 71 and 72 and the edge of the layer to be put down. In certain cases, and depending on the material composition of the layers to be put down, it might be necessary to adopt a tubular sleeve 114 of a different material. This material could, for instance, be a polyurethane, rubber or any plastic. In certain other conditions, a metal tube 113 without the sleeve might be perfectly suitable.

In the present example, the metal tube 113 at both ends is provided with a smooth bearing member 115, which supports a vertical shaft 116, which is held by a bearing arrangement 117 within the longitudinal beams 31 and 32. The bearing arrangement 117 includes two ball bearings 118 and 119, which have inner races 120 and 121 which engage portions of the shaft 116. The upper end of the vertical shaft 116 extends past the ball bearing 119 and has a thrust washer 122 and a retaining ring 123. The upper end is equipped with a sprocket wheel 124, which is secured to the upper end by a tapered pin 125. The metal tube 113 containing the vertical shaft 116 is connected to the retaining device 92, 93 by means of a thrust washer 126 held by a countersunk screw 127. In order to prevent the screws 127 from loosening unexpectedly, a stopping pin 128 has been inserted to extend between the device 92 and 93 and the wall of the metal tube 113. The retaining device 92, as illustrated in FIG. 12, has a truncated shape and is designed to enable the frictional drive acting between the vertical shaft 116 and the vertical motor-driven roller 71 by means of appropriately adopted allowances. In this way, it is possible to avoid any unwanted friction, for instance, at the end of the transportation between the layer edges and the vertical rollers 71 and 72, which solution extends the service life of the tubular sleeve 114. Other particularities of this setup allows easy dismantling of the vertical rollers 71 and 72, for instance, for changing the tubular sleeve 114.

Figure 14:
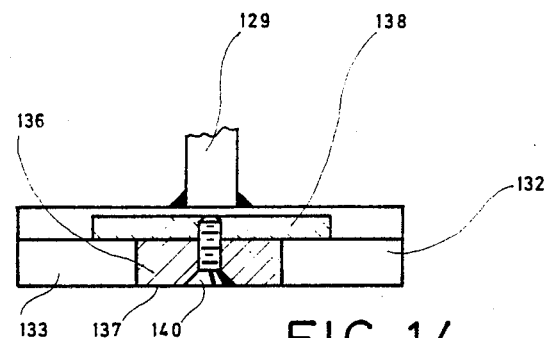
FIG. 14 is a cross sectional view taken along the lines XIV—XIV of FIG. 13.
Figure 13:
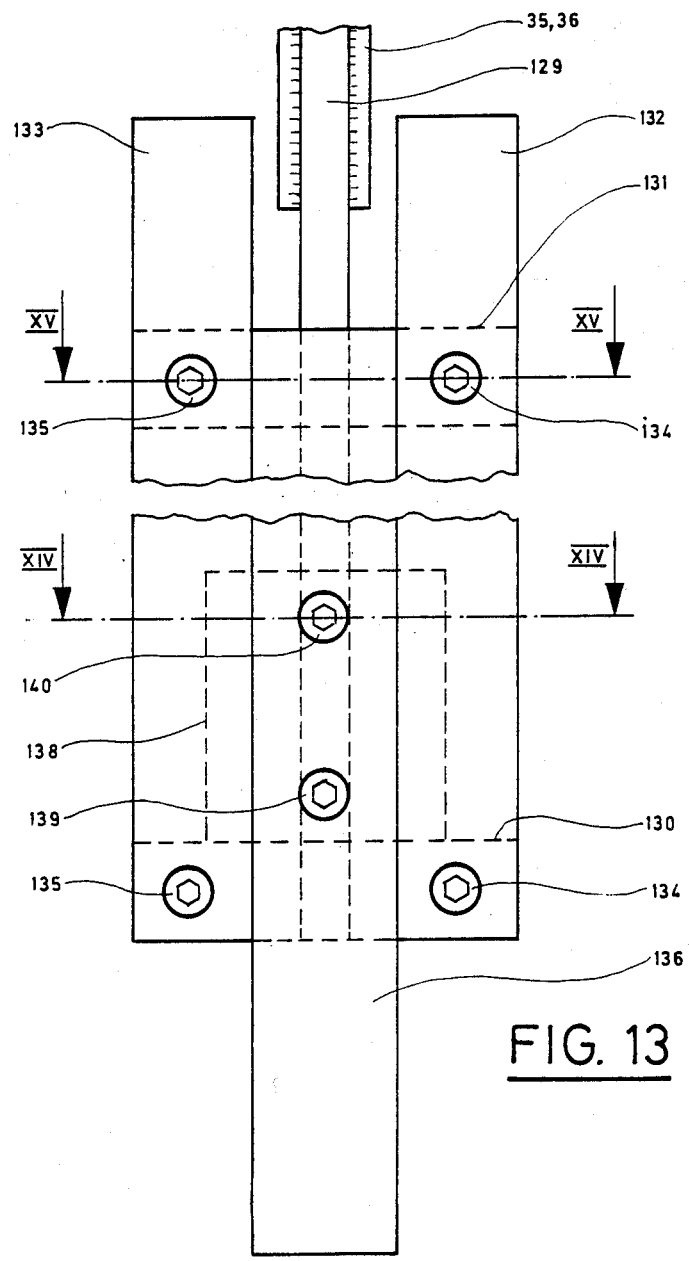
FIG. 13 is an elevational view of a telescopic-type batch guide.
Figure 15:
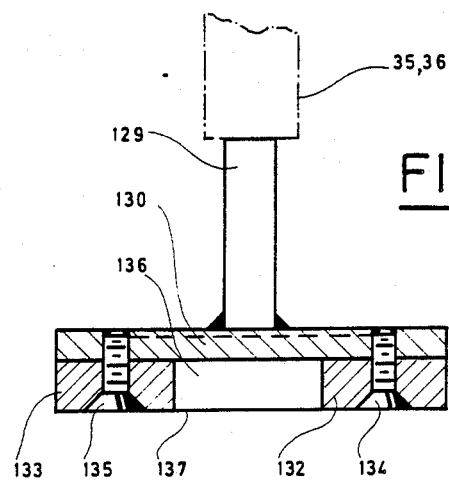
FIG. 15 is a partial cross sectional view taken along the lines XV—XV of FIG. 13.

A telescopic or extendable batch guide 91, as best illustrated in FIGS. 13, 14 and 15, is mounted in a fixed position on a support bar, such as 35 and 36 of FIGS. 1, 2 and 3. Each of the support bars 35 and 36 is provided with a plate 129, which is welded thereto. The plate 129 includes two fastening lamellae or plates 130 and 131 on which are secured two sliding pieces or rails 132 and 133, which also act to form the guiding plane 137, best illustrated in FIGS. 14 and 15. The sliding pieces 132 and 133 are secured to the fastening lamellae 130 and 131 by means of countersunk screws 134 and 135. The sliding piece 136 is fitted between the sliding rails 132 and 133 and is provided on a surface opposite the surface 137 (see FIG. 14) with a stop or an engaging plate 138, which is secured by countersunk screws 139 and 140. The plate 138 serves the double purpose of fixing the position of the sliding piece 137 with regard to the guiding rails 132 and 133 and also acts as a stop which limits the vertical movement by pressing against the fastening plates, such as 130 and 131. Conspicuously, an adequate clearance is provided between the stopping plate 138 and the front side of the plate 129 in order to insure easy vertical shifting of the sliding piece 136. The batch guide 91 has been designed so that when positioning the batch guide relative to the pile, if an obstacle is engaged the member 136 is vertically movable so that it will not cause an interference.

Figure 17:
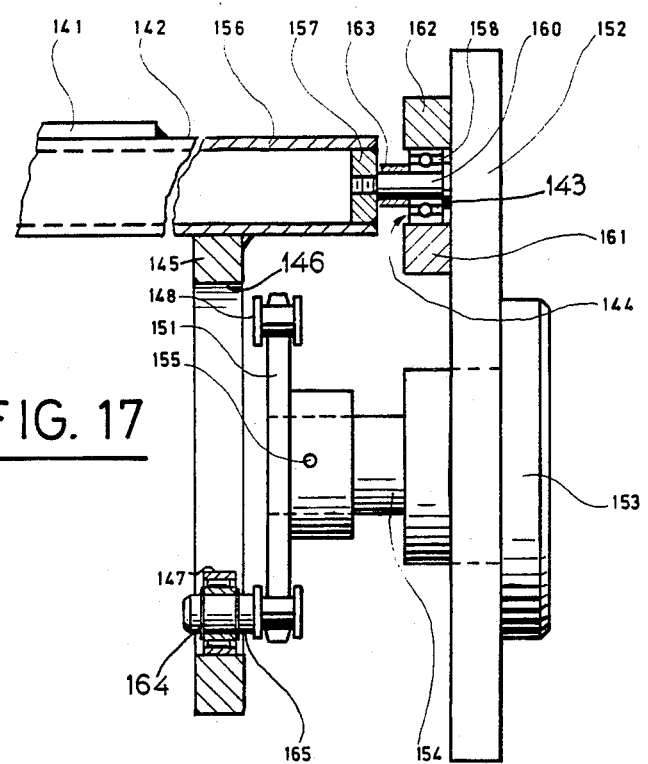
FIG. 17 is a partial cross sectional view taken along the lines XVII—XVII of FIG. 16.
Figure 16:
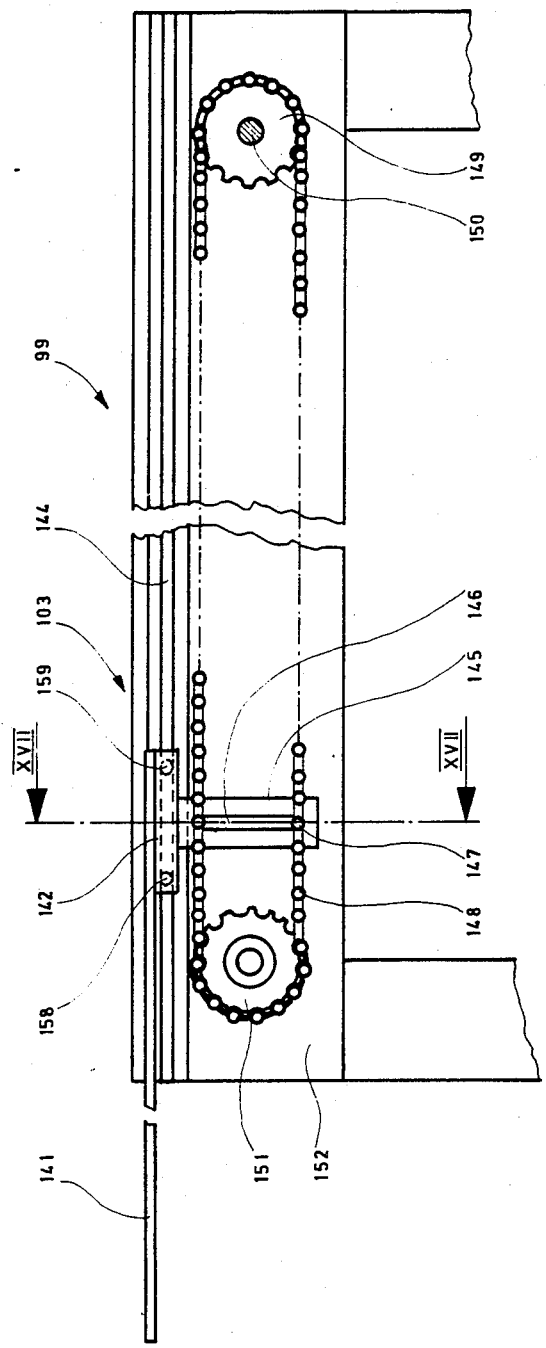
FIG. 16 is a side view with portions removed showing the retaining appliance for the batches making up a layer.

FIGS. 16 and 17 show a device for retaining the batches made up in a layer, such as the supporting appliance 103, which is described in connection with FIGS. 6–11. As already explained, this kind of supporting appliance 103 acts jointly with the retaining device 102 in order to insure the holding and carrying of the batches of a layer above the pile. The supporting device 103 includes a thin blade 141, which is secured on a carriage 142 equally equipped with rollers, such as 143 (FIG. 17), which are received between guiding rails 144, which are secured on side guides or plates 152 of the supporting table 99. The carriage 142 has a tail or member 145 which has an oblong groove 146. A roller 147, which is attached to one of the links of the endless chain 148 is received in the oblong groove and engages one of the walls of the groove to cause the shifting of the carriage 142 when the endless chain is moved. With this design, the endless chain can carry out a continuous motion determined by the sequence of the arriving batches. It is driven by a toothed wheel, such as 149 (FIG. 16), which is situated on a cross shaft 150. The endless chain also travels around a return sprocket 151 fitted on the side guide 152 of the infeed table 99, which is not shown completely in this Figure. In order to insure corrected motion of the carriage 142, such as a drive system with the chain and roller, it is obvious to use the drive system with the chain and roller on both sides of the device. Owing to the action of the roller 147 moving within the oblong groove 146, the adopted design allows an obtaining of a reciprocal movement of the carriage 142 starting with a linear continuous motion of the endless chain 148.

As best illustrated in FIG. 17, which only shows a right end section of the carriage, the side guides 152 of the infeed table 99 is provided with a ball bearing 153 holding an axle 154 on its end, which is provided with the return sprocket, such as 151, that is secured on the axle by a pin 155. A similar bearing, though not represented, is provided for supporting the shaft 150 of FIG. 16. The carriage 142 includes two tubular inserts 156 which is closed at both ends by a rectangular plug 157. Two ball-mounted rollers 158 and 159 are secured on the studs, such as 160, and screwed into the rectangular plug to insure proper guidance of the carriage 142 in the sliding rails 144, which are made up of two clamping bars 161 and 162. The lateral roller position is secured by a bushing 163 telescopically received on the stud 160. The member 145 has been welded to each end of the tubular inserts 156 of the carriage 142. As pointed out hereinbefore, this tail end member has an oblong groove 146, which receives the roller 147 and moves with the chain 148. This roller 147 is fitted on an axle 164 which is secured laterally by the retaining clip 165. The axle 164 is permanently fixed against one of the links of the endless chain 148.

Figure 18:
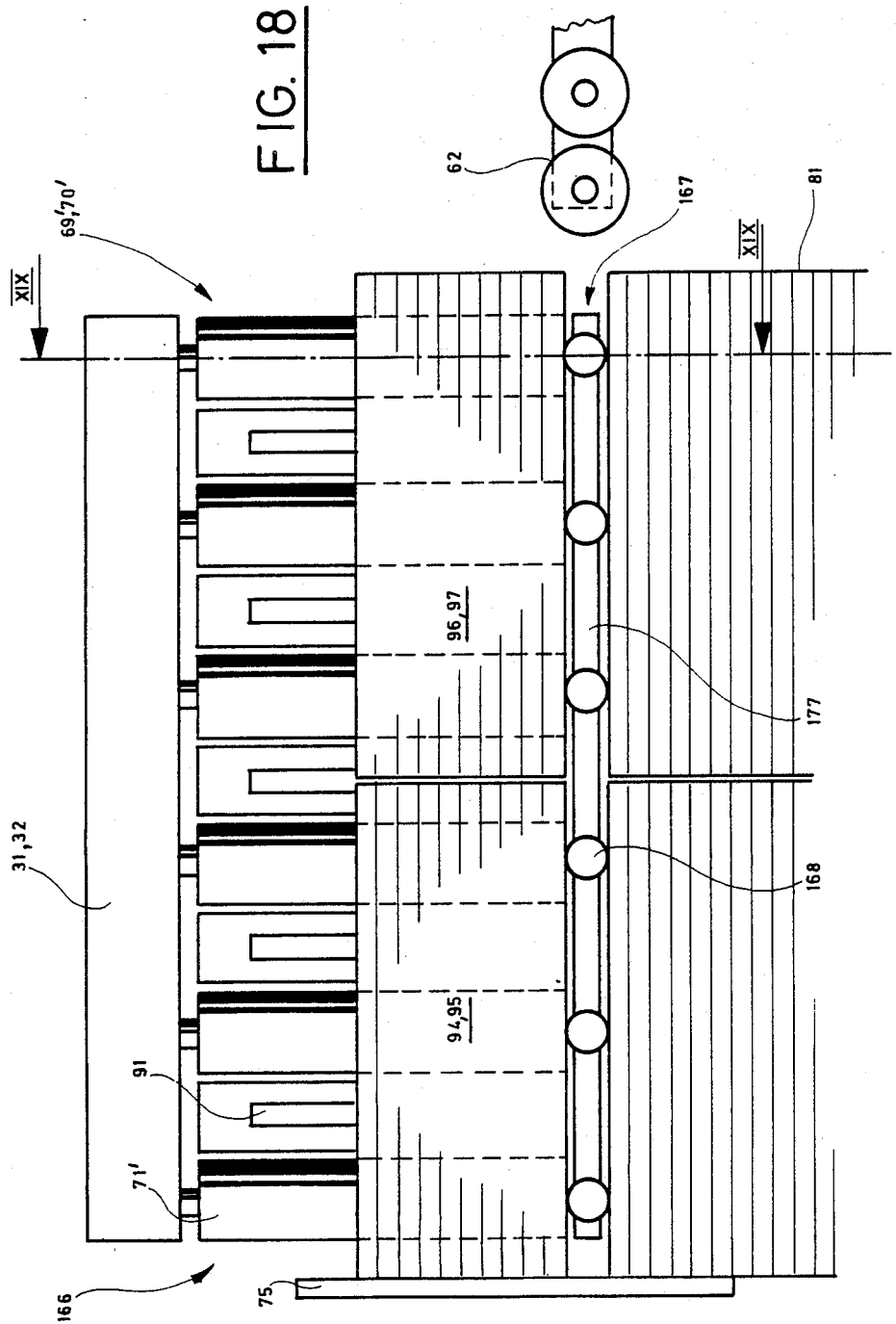
FIG. 18 is a side view schematically illustrating another embodiment of the stacking device in accordance with the present invention.
Figure 19:
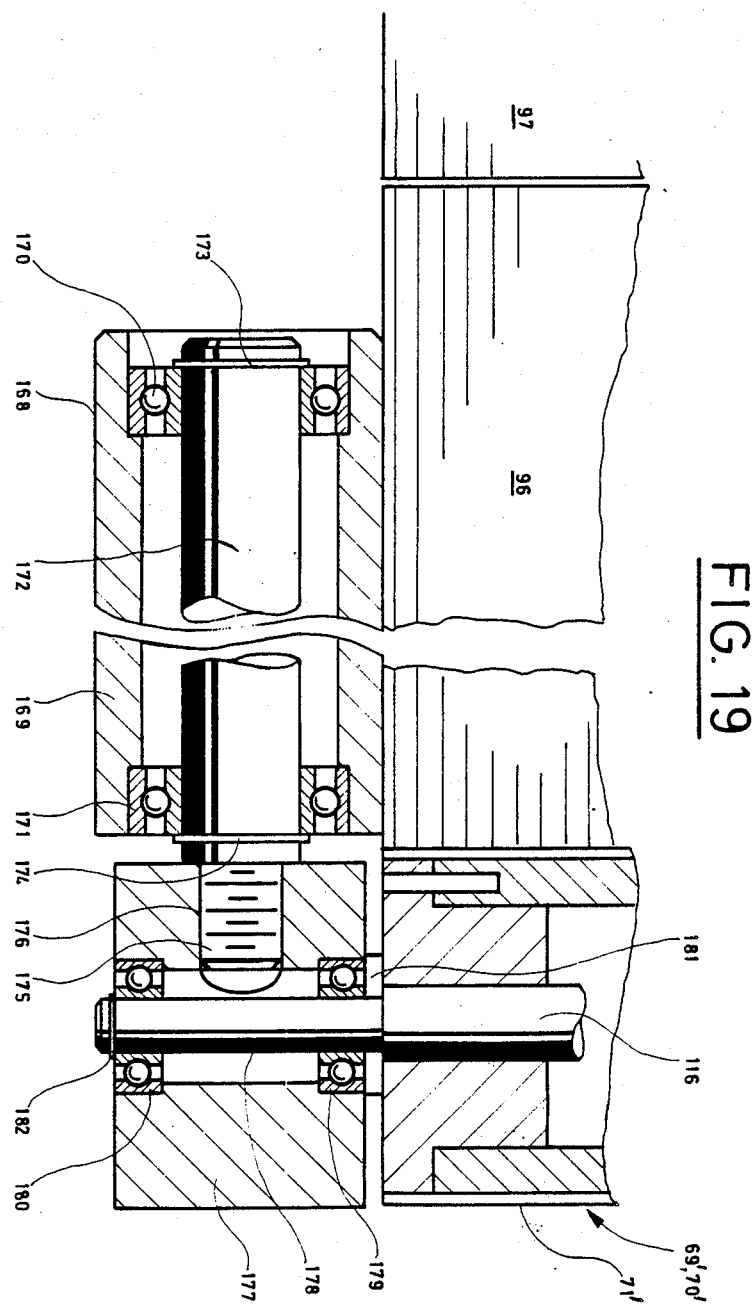
FIG. 19 is a cross sectional view taken along the lines XIX—XIX of FIG. 18.

In FIGS. 18 and 19, another embodiment of the retaining means is illustrated. As illustrated, a stacking station 166 has an infeed table 62, as well as means for conveyance, such as motor-driven vertical rollers 69' and 70'. In order to support a layer composed of batches 94, 95, 96 and 97, this embodiment includes a supporting appliance 167, which includes non-driven rollers 168, which are arranged to extend opposite the vertical axis of the rollers, such as 71'. The non-driven rollers 168 (FIG. 19) consist of a tubular sleeve 169, which is supported on a shaft 172 by ball bearings 170 and 171 disposed at the end of the sleeve 169. The ball bearings are held on the shaft by retaining rings 173 and 174. The length of the tubular sleeve 169 is determined by the minimum and maximum batch size, so as to prevent the batches from tilting under the effect of its own weight and to provide an optimum support for each of the batches, such as 96. The shaft 172 has a threaded end 175, which is secured in a tapped section 176 of a bar 177, which is mounted beneath the vertical rollers 71' of the means for conveying 69' and 70'. The vertical shaft 116 is extended to form a support or end 178, on which are secured or mounted two ball bearings 179 and 180, which are held in the bore of the bar 177. The vertical position of the bar 177, as well as the plane tangential to the not motor-driven rollers 168 is obtained by a washer 181 and a retaining ring 182, which is situated at the end of the support 178 of the vertical shaft 116.

For the use of this supporting appliance 167, such as the one described above, has the advantage of holding a layer of several batches side-by-side by means of a single supporting device. However, the linkage of such a supporting device to the lower end of the vertical rollers, such as 71', involves the necessity to envision a longer stroke for the air pistons 33 and 34 of FIG. 1, so as to allow the assembly consisting of the supporting appliance 167 and the conveyor 69' and 70' to be withdrawn fully from underneath the layer in order to enable this very layer, which is still arranged between the batch guides, to be put down onto the pile 81, which is being built.

The device is controlled by a control means which has various sensors, such as microswitches, to determine the arrival of the layer of batches in predetermined positions. Thus, when feeding the batches between the groups 69 and 70 of motor-driven rollers 71, these rollers will be rotating at the desired speed until the leading edge of the batch strikes a stop, such as 75, at which time a sensor will provide a signal to the control means to shift to the next step, which is stopping the motorized rollers and actuating the pneumatic cylinders to shift the rollers out of engagement with the batches so that the batches may be lowered onto the pile. After lowering the batches on the pile, the elevator or table 84 is lowered the desired amount so that the top surface of the new pile is moved to the prior desired position. This can be determined by appropriate sensing devices, such as an optical sensor, such as used in the above-mentioned copending U.S. Application. If the embodiment of the stacker includes the supporting blade or retainer 102, its movement is also synchronized with the advancement of the rollers for the feed table and the operation of the power driven vertical rollers.

The invention is obviously not limited to the examples just described, especially so with regard to the control of the supporting appliance for the central area of the layer. In fact, it would be possible to provide the use of another form of drive system for the thin plate 141. For example, it might be possible to imagine the thin plate being moved by means of a device with two rubber coated rollers driven in an appropriate way in a range so as to cause the thin plate to reciprocate by having it pinched between them in order to bring about a driving motion, such as can be found in board sheet transport systems of a printing press.

Although various minor modifications may be suggested by those versed in the art, it should be understood that I wish to embody within the scope of the patent granted hereon all such modifications as reasonably and properly come within the scope of my contribution to the art.

I claim:

1. In a piling device for flat objects arranged batchwise, especially folded boxes of corrugated board or non-folded blanks of boxes arranged in successive layers on any sort of loading plane, said device including a frame containing infeed means for conveying the batches into the device on a conveying axis, means for carrying a layer of batches from the infeed means to a point above a vertically movable loading plane, means for retaining and then laying down the layer on top of said loading plane, means for laterally guiding of the layer as the layer is being laid down onto the loading plane, stop means for positioning a front edge of each layer in said means for carrying and means for vertically shifting said loading plane, the improvements comprising said infeed means for the batches being made up of a table having motor-driven rollers with axles, said rollers cooperating with a lateral baffle arranged at right angles to the axles of said motor-driven rollers, said means for carrying a layer of batches to a point above the vertical moving loading plane consisting of two rows of spaced apart motor-driven, vertically arranged rollers for engaging opposite sides of the layer to be carried forward, mounting means for adjustably positioning said two rows in said frame laterally to said conveying axis, said mounting means including two supporting bars being movable in the frame by a setting appliance, a longitudinal beam for mounting each row of rollers, each beam being connected by air cylinders to one of said supporting bars to move therewith, said means for retaining and then putting down said layer including a retaining appliance operating jointly with each vertically arranged roller and a support operating jointly with said two rows, said means for laterally guiding said layer consisting of vertical batch guides being mounted on said supporting bars to extend within spaces existing between the vertically arranged rollers of said rows, said stop means comprising a front stop plate having an adjustable size as required by the size of said batch, and said lateral baffle being secured to an extension of one of said rows situated on the side of the conveying axis.

2. In a device according to claim 1, wherein the setting appliance includes an endless chain extending between two sprockets and driven by a motor, an upper chain portion being connected by a member to one of the supporting bars, and a lower chain portion being connected by a member to the other supporting bar, so that rotation of said motor in one direction moves both bars away from each other and rotation in an opposite direction moves both bars together.

3. In a device according to claim 1, wherein the retaining appliance includes a truncated disk secured on the lower end of each vertically arranged roller, said support having a reciprocating movement in the direction of the conveying axis.

4. In a device according to claim 3, wherein the support is reciprocated by an arrangement including an endless chain having a link supporting a roller, said roller being received in an oblong groove of a member secured to a carriage for the support, said carriage being guided in a sliding rail so that as the chain moves continually in one direction, the carriage is carried therealong until the link moves over the sprocket, at which time the carriage will be moved in the opposite direction.

5. In a device according to claim 1, wherein the means for retaining and then putting down the layer includes a beam permanently connected with each row of vertically arranged rollers situated on a lower end of said rollers, said beam supporting non-driven rollers arranged to extend opposite the vertical axis of every vertically arranged roller underneath said layer.

6. In a device according to claim 1, wherein the vertical batch guides have two side rails to form a guiding plane for the batches and between said rails has a vertically shiftable sliding piece, which is equipped at least with one baffle plate.

* * * * *